United States Patent [19]

Kawabata et al.

[11] 4,075,705
[45] Feb. 21, 1978

[54] CALCULATOR FOR DETERMINING CUBIC ROOTS

[75] Inventors: Yoichi Kawabata; Minoru Machida, both of Tokyo, Japan

[73] Assignee: Canon Kabushiki Kaisha, Tokyo, Japan

[21] Appl. No.: 640,845

[22] Filed: Dec. 15, 1975

[30] Foreign Application Priority Data

Dec. 16, 1974 Japan .................... 49-144741

[51] Int. Cl.² ............................................. G06F 7/48
[52] U.S. Cl. .................................................. 364/752
[58] Field of Search ............... 235/156, 159, 160, 164, 235/158; 444/1

[56] References Cited

U.S. PATENT DOCUMENTS

| 2,751,149 | 6/1959 | Young et al. | 235/158 |
| 3,526,760 | 8/1970 | Ragen | 235/158 |
| 3,900,722 | 8/1975 | Cochran et al. | 235/152 |
| 3,906,210 | 7/1975 | Mignot | 235/158 |

OTHER PUBLICATIONS

Announcing the SR—50 Super Slide—Rule Calculator Texas Instruments, Sept. 3, 1974.
SR—52 Handheld Programming Power, Scientific American, Oct. 1975, cover & p. 1.

Primary Examiner—David H. Malzahn
Attorney, Agent, or Firm—Fitzpatrick, Cella, Harper & Scinto

[57] ABSTRACT

A compact electronic calculator having the function of extracting cubic roots comprises a first register for storing therein a number, a circuit for dividing the number in the first register at every three digits and effecting subtraction therefrom, and a second register for storing therein the data provided by the dividing circuit.

5 Claims, 10 Drawing Figures

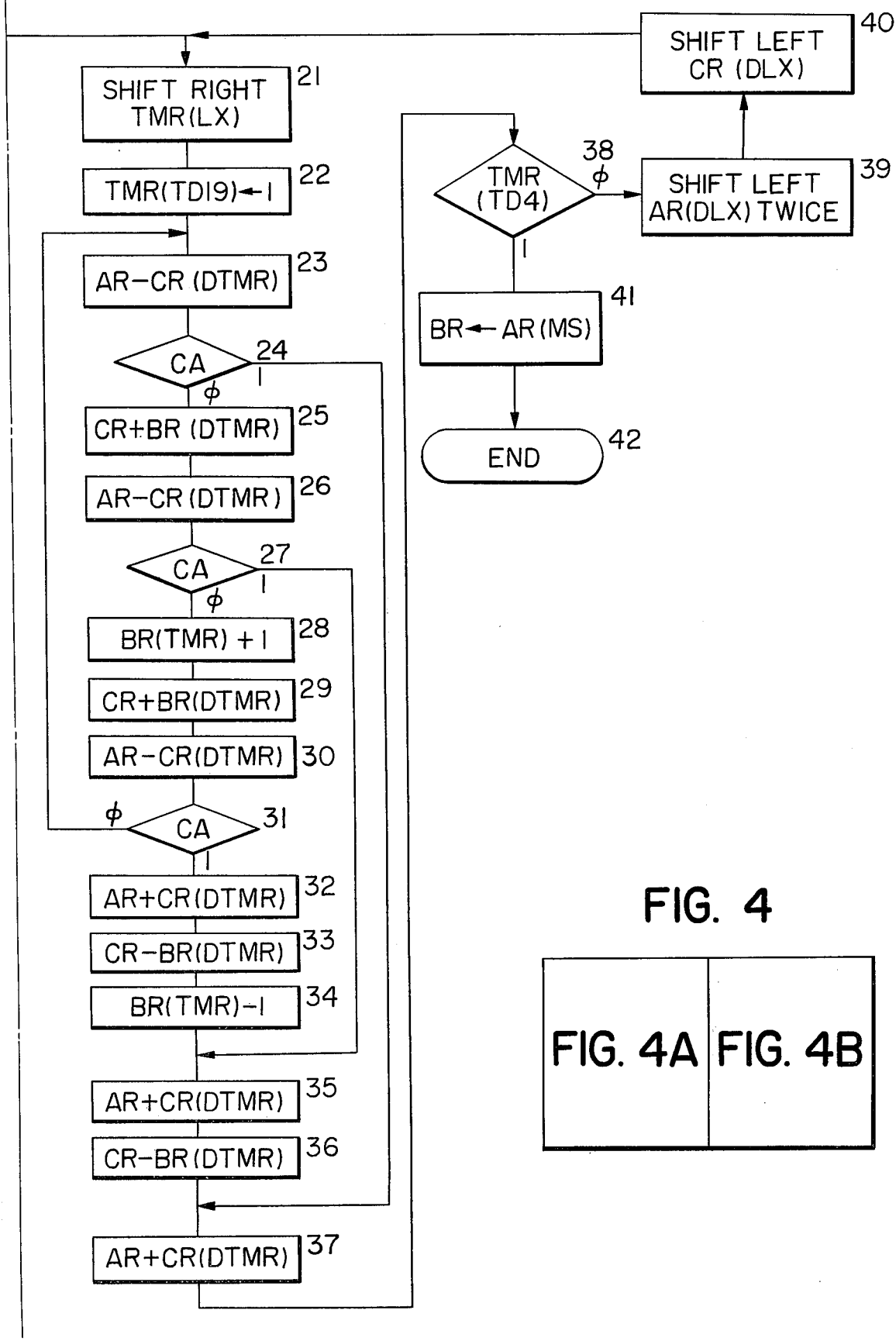

FIG. 5A

| STEPS | AR | BR |
|---|---|---|
| | MSD                                      LSD | |
| 1 | | 005000000000000000100 |
| 2 | 000000000000000000000000000000000000000 | |
| 6 | 000000000000000000000050000000000000300 | 00000000000000000000 |
| 7-1 | | |
| 8 | | |
| 9 | | |
| 10 | 000000000000000000000000500000000000000 | |
| 11 | | |
| 12 | | 00000000000000000100 |
| 10 | 000000000000000000000005000000000000700 | |
| 11 | | |
| 13 | 000000000000000000000005000000000000000 | |
| 15 | | |
| 7-2 | | |
| 16 | 000000000000000000000005000000000000009 | |
| 20 | | |
| 21-1 | | |
| 23-1 | | |
| 28 | | 001000000000000000100 |
| 29 | | |
| 30-1 | 000000000000000000000004000000000000009 | |
| 23-2 | 000000000000000000000003000000000000009 | |
| 26 | 000000000000000000000001000000000000009 | |
| 30-2 | 999999999999999999999997000000000000009 | 002000000000000000100 |
| 34 | 000000000000000000000001000000000000009 | 001000000000000000100 |
| 36 | 000000000000000000000003000000000000009 | |
| 37 | 000000000000000000000004000000000000009 | |
| 38-1 | | |
| 40 | 000000000000000000000004000000000000009 | |
| 21-2 | | |
| 38-2 | 000000000000000000000087000000000000009 | 001700000000000000100 |
| 38-3 | 000000000000000000000087000000000000009 | |
| 38-4 | 000000000000000000085561710000000000009 | 001709000000000000100 |
| 38-5 | 000000000000000000066617870100000000009 | 001709900000000000100 |
| 38-6 | 000000000000000000052164383027000000009 | 001709970000000000100 |
| 38-7 | 000000000000000008304293765625000000009 | 001709975000000000100 |
| 38-8 | 000000000000000409450458697521000000009 | 001709975900000000100 |
| 38-9 | 000000000000005856834105993941600000009 | 001709975940000000100 |
| 38-10 | 000000000000059360219984421094640000009 | 001709975946000000100 |
| 38-11 | 000000000000672790071977864593304000009 | 001709975946600000100 |
| 38-12 | 000000000005874634698310907606103700 0009 | 001709975946670000100 |
| 38-13 | 000000000061140276955050703451962240 0009 | 001709975946676000100 |
| 38-14 | 000000000850795766724355259365656904 0009 | 001709975946676600100 |
| 41 | | 001709975946676600100 ANSWER |

FIG. 5B

| CR | TMR | NOTE |
|---|---|---|
| ⋮ | ⋮ | |
| 000000000000000000000000000000000000000 | | |
| 000000000000000000000000000000000003000 | 00000000000000000000 | INITIALIZATION END |
| ⋮ | 00000000000000000100 | ⎤ |
| 000000000000000000000000000000000000300 | ⋮ | |
| ⋮ | ⋮ | A LOOP OF CHARACTERISTIC PORTION OVER 3 |
| ⋮ | ⋮ | |
| ⋮ | 00000000000000000010 | ⎦ |
| 000000000000000000000000000000000000003 | 00000000000000000111 | ← LOOP END |
| ⋮ | 11000000000000000000 | ⎤ |
| | 01100000000000000000 | |
| | 11100000000000000000 | |
| | ⋮ | |
| | 11100000000000000000 | |
| | ⋮ | |
| 00000000000000000000000100000000000000003 | ⋮ | MAIN LOOP |
| ⋮ | ⋮ | |
| 000000000000000000000020000000000000003 | | |
| 000000000000000000000040000000000000003 | | |
| 000000000000000000000020000000000000003 | | |
| 000000000000000000000010000000000000003 | | |
| ⋮ | ⋮ | |
| 000000000000000000000010000000000000003 | 01110000000000000000 | ⎦ ONLY ENDS OF THE MAIN LOOPS ARE ILLUSTRATED BELOW. |
| 00000000000000000000002890000000000000003 | 11110000000000000000 | |
| 00000000000000000000002890000000000000003 | 11111000000000000000 | |
| 0000000000000000000029206810000000000000003 | 11111100000000000000 | |
| 000000000000000000029237580100000000000003 | 11111110000000000000 | |
| 00000000000000000002923997400900000000003 | 11111111000000000000 | FIG. 5 |
| 0000000000000000002924014500625000000003 | 11111111100000000000 | |
| 000000000000000002924017578580810000003 | 11111111110000000000 | FIG.5A \| FIG.5B |
| 00000000000000002924017715378883600000003 | 11111111111000000000 | |
| 0000000000000002924017735893594916000003 | 11111111111100000000 | |
| 000000000000002924017737950566051560003 | 11111111111110000000 | |
| 00000000000002924017738189962684088900003 | 11111111111111000000 | |
| 000000000000292401773821048239544897600003 | 11111111111111100000 | |
| 00000000000292401773821253436658498756003 | 11111111111111110000 | |
| ⋮ | | |

CALCULATOR FOR DETERMINING CUBIC ROOTS

BACKGROUND OF THE INVENTION

1. Field of the Invention

This invention relates to a compact electronic calculator which is capable of extracting cubic roots.

2. Description of the Prior Art

In the conventional compact electronic calculators, extraction of cubic roots has been done either by the approximation method wherein logarithms and exponents are combined to extract cubic roots, or by the Newton method. The approximation method has required subroutines of calculating logarithms and exponents and involved the use of the above-described combination for arithmetic operations, and has thus been very slow in operating speed and low in accuracy of calculation. The Newton method has been employed in large calculators and is inferior to the present invention in operating circuit configuration, operating time and accuracy of calculation.

SUMMARY OF THE INVENTION

In view of these points, the present invention intends to provide a compact electronic calculator which is simple in construction, and fast and accurate in arithmetic operation.

Other objects of the present invention will become fully apparent from the following detailed description of some embodiments thereof taken in conjunction with the accompanying drawings.

BRIEF DESCRIPTION OF THE DRAWINGS

FIG. 3 (b) illustrates the fixed timing of the timer (TMR).

FIGS. 4A and 4B, when combined in accordance with form a flow chart for illustrating an embodiment of the compact electronic calculator according to the present invention.

FIG. 5 is a block diagram showing, in combination, FIGS. 5A and 5B which illustrate the conditions of registers.

DESCRIPTION OF THE PREFERRED EMBODIMENTS

The compact electronic calculator performs calculation of cubic roots in accordance with the principle which will hereinafter be described. Based on and by interative use of the equation $$1^3 + 2^3 + 3^3 \ldots + n^3 = (1 + 2 \ldots + n)^2 \quad (1)$$

it obtains a cubic root for each digit of a number, and can strictly obtain the cubic root for up to the least significant digit of the number however many digits it has.

By modifying equation (1) into $$n^3 - (n-1)^3 = (n-1)^2 + (n-1)n + n^2, \quad (2)$$

equation (1) will become more comprehensible as follows:

$$\left.\begin{array}{l} 1^3 = 1 \\ 2^3 = \phantom{00} 3 + 5 \\ 3^3 = \phantom{0000} 7 + 9 + 11 \\ 4^3 = \phantom{000000} 13 + 15 + 17 + 19 \end{array}\right\} \quad (3)$$

Equations (1), (2) and (3) are entirely equivalent in numerical significance, and the following description will be made with emphasis laid on equation (2).

Equation (2) has square terms on its right-hand side. Assuming that N is a given number and M a variable the result of which can be obtained, and by using L as an intermediate variable, equation (2) may be rewritten into a flow chart as shown in FIG. 1.

Figure 1:
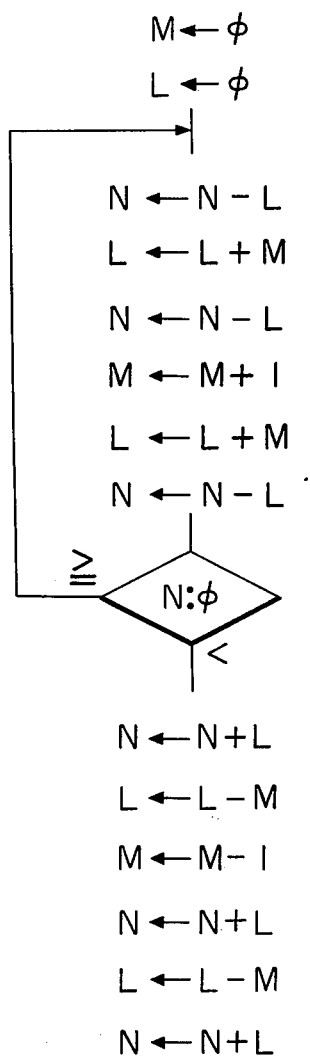
FIG. 1 illustrates the principle on which the compact electronic calculator of the present invention is based to obtain a cubic root.

The operation shown in FIG. 1 is iterated with the mantissa portion divided at every three digits. The characteristic portion may be divided by 3, as will be apparent.

More specifically, by using a timer and shift which will hereinafter be described, a loop iterative for every three digits may be formed outside the flow chart shown in FIG. 1.

Figure 2:
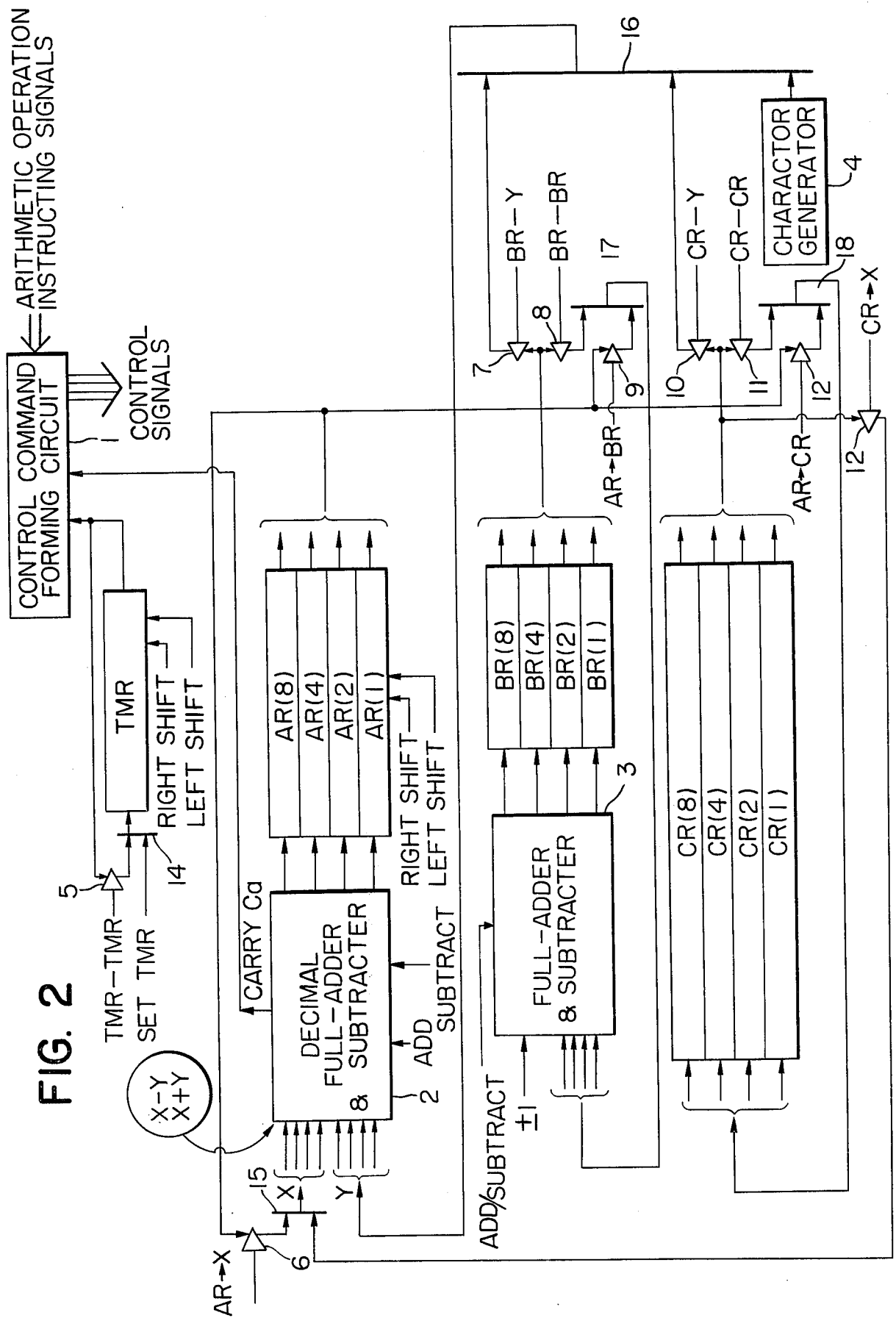
FIG. 2 diagrammatically shows an embodiment of the operating circuit which constitutes the essential portion of the compact electronic calculator according to the present invention.

FIG. 2 is a block diagram of an embodiment of the arithmetic operation processing circuit which constitutes the essential portion of the electronic calculator according to the present invention.

A control command forming circuit 1 may, for example, comprise a read only memory (ROM) or the like, and discriminate arithmetic operation commands and internal conditions of the calculator to put out control signals in succession.

Figure 3A:
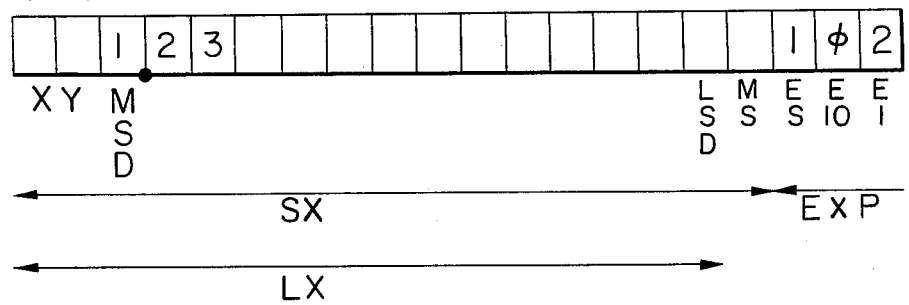
FIG. 3 (a) illustrates the timer (TMR).
Figure 3B:
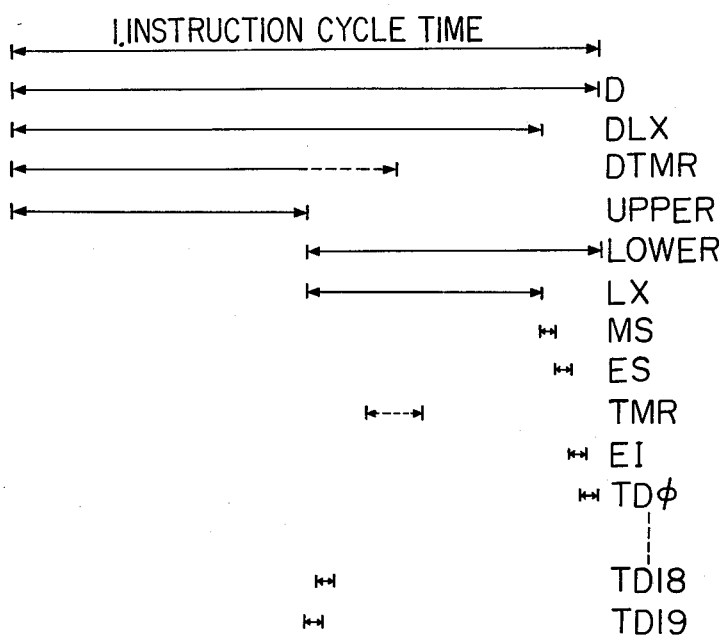

The timer (hereinafter referred to as TMR) may be a 20-bit shift register functioning as a set-reset circuit and capable of right shift and left shift, and is used to indicate the arithmetic operation time through the control command forming circuit 1. Referring to FIG. 3(a) which shows the structure of the timer timing to illustrate the basic timing, X and Y represent usually unused (redundant) digits, MSD the most significant digit, LSD the least significant digit, MS the digit indicative of the sign of the number, and ES, E10 and E1 are digits indicative of indices and store binary coded decimal numbers from 1 to 199, of which 100 represents the index 0. SX represents digits $x$ to MS, and LX the digits within the length from $x$ to LSD. The control command forming circuit 1 generates a time variable with signal of TMR as the reference and in addition, the fixed timing as shown in FIG. 3(b). In this figure, D represents 40-bit time, double the length of TMR, DLX 20 bits of UPPER time plus LX, DTMR 20 bits of UPPER time plus any set time width of TMR, UPPER the upper 20 bits of one cycle time, LOWER the lower 20 bits of one cycle time, LX, MS, ES, E1 represent the lengths shown in FIG. 3, and TD0, . . . TD18, TD19 represent digit times, i.e. respective bit times of TMR. TMR is any set time width of TMR.

AR designates a 40-digit shift register having a decimal full-adder and subtracter 2 and it comprises a series of 4-bit parallel driven registers as does a shift register BR or CR which will hereinafter be described. The shift register AR circulates with 40-bit time as one cycle. It also has the functions of right shift and left shift. BR is a 20-digit shift register and 4-bit parallel driven like the shift register AR. It is provided with a full-adder and subtracter 3. CR is a 40-digit shift register and is driven in 4-bit parallel fashion.

It will thus be seen that the time for one instruction is 1-cycle time of the shift register AR, namely, 40-bit time. Such 40-bit time is divided into UPPER time and LOWER time. The decimal full-adder and subtracter 2 provided for the shift register AR is controlled by an add and subtract instruction generated from the control command forming circuit 1 and the data entering such decimal full-adder and subtracter 2 comprises X-input which is the OR output from the fed-back outputs of the shift registers AR and CR, and Y-input which is the OR input from the shift registers BR and CR and character generator 4 through the data bus line. An output carry Ca of the decimal full-adder and subtracter 2 is being supplied to the control command forming circuit 1.

The shift register BR, which has half the memory capacity of the shift register AR, is provided with a full-adder and subtracter 3 and effects the circulation of the data within the registers to introduce or deliver the data from or into the shift register AR. The full-adder and subtracter 3 of the shift register BR receives +1 and −1 instructions from the control command forming circuit 1 and executes these instructions.

A shift register CR (hereinafter referred to as CR) is of the same capacity as the shift register AR and introduces or supplies the data from or to the shift register AR. Gates 5, 6, 7, 8, 9, 10, 11, 12, 13 and OR gates 14, 15, 16, 17, 18 are provided for the transfer of data between the registers and for other purposes.

Operation of the embodiment constructed as described above will now be described with $3 \sqrt{5}$ as an exercise and by reference to the flow chart of FIG. 4 and the data flow shown in FIG. 5.

The number 5 whose cubic root is to be extracted is entered into the shift register BR by depressing input means such as a numeric key on a keyboard (not shown). This corresponds to step 1 or the START in the flow chart of FIG. 4. The then conditions within the shift regidters AR, BR, CR are shown at step 1 of the data flow illustrated in FIGS. 5A and 5B.

Subsequently, an arithmetic operation command is sent by the cubic root key on the keyboard, whereby the control command forming circuit 1 effects the following controls in succession.

First, in order that the contents of the shift registers AR and CR may be all cleared, the AR→X gate 6 and the CR→CR gate 11 shown in FIG. 2 are closed. This is step 2. The internal conditions of the shift registers AR, BR, CR, at the end of this step 2 is shown at step 2 of FIG. 5. Next, the character generating circuit 4 generates a character "3" at the time MS indicated in FIG. 3(b), and this character is first entered into the shift register AR through the data bus line and the Y-input of the decimal full-adder and subtracter 2, and then passed through the AR→CR gate 12 for storage in the shift register CR. The AR→X gate 6 is being closed, as the result of which "3" enters the digit MS of the shift register CR, namely, the fourth least significant digit, so that the digit MS of the shift register AR becomes cleared. The next step 4 is the swapping between the LOWER portion of the shift register AR and the shift register BR, which occurs with the BR→Y gate 7, and the AR→BR gate 9 being open but the AR→X gate 6 and the BR→BR gate 8 being closed, over the range LOWER of the time shown in FIG. 3(b). In the next step 5, "2" is generated by the character generating circuit 4 in order that this character "2" may be entered into the digit ES of the shift register AR, namely, the third least significant digit, while an add instruction is imparted from the control command forming circuit 1 to the decimal full-adder and subtracter 2 so that the character "2" generated by the character circuit 4 is added to the digit ES of the shift register AR.

In the next step 6, the TMR→TMR gate 5 is closed for the time LOWER so that the contents of TMR are all cleared. What has so far been described forms the initialization step in the data flow chart of FIGS. 5A and 5B, and the conditions within the shift registers AR, BR, CR in step 6 are shown at step 6 of FIG. 5.

Next comes the process whereby the characteristic portion of the data stored in the shift register AR is divided by 3 during steps 7 to 15 shown in FIG. 5. When the process of steps 7 to 15 has been iterated three times, the characteristic portion has been divided by 3. The subtraction and addition in steps 10 and 13 occur only for the digit time to which TMR is set. When step 16 is reached after the above process, the registers AR, BR, CR assume the conditions as shown in FIGS. 5A and 5B.

Figure 4A:
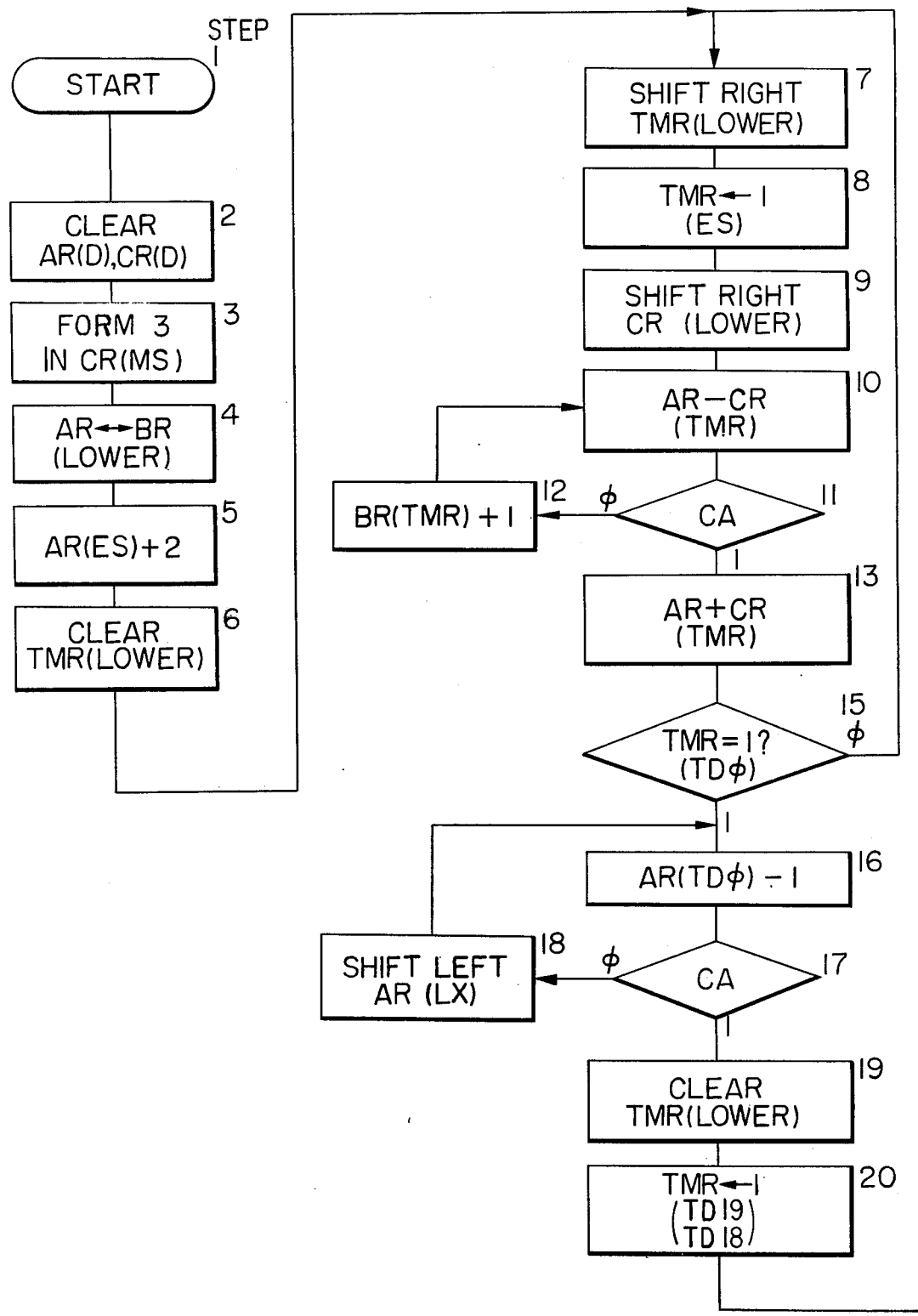

Steps 16–19 seen in FIG. 4 are the pre-process routine before the main loop is entered. In the present exercise, "1" is generated by the character generating circuit 4 at the time TDO while a subtract instruction is put out by the control command forming circuit 1, whereby the operation of step 16 is executed. In this case, TDO of the shift register AR is "0" and no subtraction can occur, so that carry takes place and as the result of the presence or absence of such carry being discriminated, step 19 shown in FIG. 4 is to be reached. Upon discrimination of such carry, the carry provided by the decimal full-adder and subtracter 2 is discriminated within the control command forming circuit 1, which thus puts a next control signal. Hereupon, all clear of TMR is effected in the manner already described with respect to step 6 of FIG. 4. In step 20 of FIG. 4, there is generated a set signal which sets the most significant and next digits of TMR to "1" at time TD18 and time TD19. Thereafter, the main loop for obtaining the cubic root of the mantissa portion is entered, and the conditions of the various parts at the point whereat the main loop is entered become as shown at step 20 of FIGS. 5A and 5B. First, in step of FIG. 4, the contents of TMR are shifted to right for time LX, and then TD19, i.e. the most significant digits, of TMR is set to "1". As the result, TMR assumes the conditions in which the three most significant digits have been set to "1". Subsequently, a subtract instruction is generated by the control command forming circuit 1 to open the CR→Y gate 10. Since the gate 10 remains open for the time DTMR, the operation of the shift registers AR-BR is executed over the portion of FIG. 3(b) to which UPPER and TMD are set, namely, for a time corresponding to twenty-three digits. Since the time ranges designated for the shift register BR are all "0", the conditions become the same as those when the shift register AR-O is executed and thus, no carry takes place. Consequently, the process advances to step 25 of FIG. 4 and the addition of the shift registers CR and BR which is one of special instructions is carried out over the aforesaid range of DTMR. This first opens CR→X, AR→CR, BR→Y gates 13, 12, 7 but closes AR→X, CR→CR gates 6, 11, so that an add instruction is imparted from the control command forming circuit 1 to the decimal full-adder and subtracter 2. In consequence, the result of the addition of the shift registers CR and BR enters the shift register AR, the contents of which in turn enters the shift register CR. During the time corresponding to the latter half forty digits, CR→Y gate 10 and AR→CR gate 12 are opened while AR→X gate 6 and CR→CR gate 11 are closed, whereby swapping is caused between the shift registers AR and CR, so that the addition of the shift registers CR and BR enters the shift register CR. In the present stage of the description, however, the contents of both shift registers are "0" and thus, there is no variation in data between these shift registers. One instruction cycle corresponds to 40-digit time, as a rule, and instructions with such time as unit are successively delivered from the control command forming circuit 1 in a changed-over fashion. Nevertheless, instructions CR+BR and CR−BR are automatically generated as multiple time instructions in the control command forming circuit 1 and for the instruction CR+BR, operations CR+BR→AR and AR→CR are effected during the first half 40-digit time and AR⇌CR is effected during the latter half 40-digit time. For the instruction CR−BR, operations CR−BR→AR and AR→CR are effected during the first half 40-digit time and AR⇌CR is effected during the latter half 40-digit time. Subsequently, the same instruction as in step 23 is executed in step 26, whereas in the present stage of the description, no variation in data has occured as yet and no carry takes place. Thus, as the result of the discrimination between the presence and absence of the carry, the process advances to step 28.

In this step, the control command forming circuit 1 supplies an add instruction to the full-adder and subtracter 3 of the shift register BR and "1" to the data input, so that "1" enters the least significant digit of the time LOWER to which TMR is set. The shifts have all been "0" and as the result, "1" enters the third most significant digit of the shift register BR. The process then advances to step 29 shown in FIG. 4, during which the same operation as that in step 25 is executed and with "1" input to the shift register CR, the process advances to step 30 during which the same operation as that in step 26 is executed, but it should be noted here that "1" has already been input to the shift register CR. Since, however, the shift register AR has stored therein the number "5" greater than "1" and whose cubic root is required, the result of the subtraction becomes such as shown in step 30-1 of FIG. 5. No carry takes place at this time and therefore, after the presence or absence of carry is discriminated in the next step 31, the process jumps to step 23 of FIG. 4.

The operation in this step has already been described and only the variations in data are shown in steps 23-2, 26 and 30-2 of FIG. 5.

In step 30-2, full subtraction cannot be fulfilled but carry takes place and the process now advances to step 32. This step is to correct the excess subtraction, and the circuit operation involved therein is simply that, of the above-described arithmetic operations of the shift registers 4–6, the add instruction is supplied from the control command forming circuit 1 to the decimal full-adder and subtracter 2. Step 33 is to correct the shift register CR and step 34 to correct the shift register BR. These operations are performed in the manner as described with respect to the operations for the various instructions hitherto mentioned. Ensuing steps 35, 36 and 37 are also to effect corrections.

Steps 32, 35 and 37 are those to which the various jumps are directed, and these show that corrections are being performed for the excess subtraction which would occur at any of the three locations where excess subtraction in the main routine may be discriminated.

The correction of excess subtraction is followed by step 38 of FIG. 4 which is to discriminate whether the fourth least significant digit of TMR is set or not. At this point, the shift register BR contains therein as many interim results of the solution as the frequency with which the main routine has ever been passed through. In the present exercise, TMR is set only for the three most significant digits and so, the process advances to step 39, during which the control command forming circuit 1 generates a two-digit left shift signal for the shift register AR so that shift occurs within the time DLX. Thereafter, the shift register CR makes left shift to cause a jump to step 21, whereby the job of the second main routine is started. When the main routine commencing with this step 21 has since been passed through fourteen times, the discrimination of TMR in step 38 will be "1" in the present embodiment and the process advances to step 41. This brings the arithmetic operation to an end, and the result is stored in the shift register BR and edited for display, and then enters the shift register AR, and finally the solution of the cubic root is displayed by an unshown displayer.

The compact electronic calculator according to the present invention can obtain the solution of any cubic root by simplified construction as described and with higher accuracy and speed.

What is claimed is:

1. A calculator comprising:
   numerical keys for entering numerical data into said calculator;
   a cubic root key for actuation to enter an instruction signal operative to extract a cubic root;
   storage means coupled to said numerical keys for storing the data entered by said numerical keys; and
   processing circuit means coupled to said cubic root key and said storage means and operative in response to said cubic root instruction signal for developing the cubic root of the data in said storage means, wherein said processing circuit means comprises means for processing the data stored in said storage means as sets of data, wherein each set includes three successive digits of the data in the storage means, and for performing numerical operations on each of the respective sets.

2. A compact electronic calculator for determining cubic roots comprising:
   first register means for storing first data whose cubic root is to be determined;
   means coupled to said first register means for processing the first data in sets wherein each set includes three successive digits of the first data;
   second register means for storing second data for numerically processing each of the three-digit sets;
   means coupled to said second register means for subtracting the contents of said second register from at least one of the three-digit sets until a negative remainder is obtained;
   third register means for storing third data, and means for incrementally increasing said third data in response to subtractions executed by said subtracting means; and
   means for adding the contents of said third register means to said second register means.

3. A compact electronic calculator according to claim 2, wherein said first register means comprises a register having a capacity at least twice that of said third register means.

4. A compact electronic calculator for determining cubic roots comprising:

first register means for storing first data whose cubic root is to be determined;

means coupled to said first register means for entering a command to extract the cubic root of the first data; and means operative in response to said command entering means for numerically processing the first data, the processing means including:

means coupled to said first register means for processing the first data into sets wherein each set includes three successive digits of the first data;

second register means for storing second data for processing each of the three-digit sets;

means coupled to said second register means for subtracting the contents of said second register from at least one of the three-digit sets until a negative remainder is obtained;

third register means for storing third data, and means for incrementally increasing said third data in response to subtractions executed by said subtracting means; and means for adding the contents of said third register means to said second register means.

5. A compact electronic calculator according to claim 4, wherein said first register means comprises a register having a storage capacity which is twice that of said third register means.

* * * * *